United States Patent Office 3,283,745
Patented Nov. 8, 1966

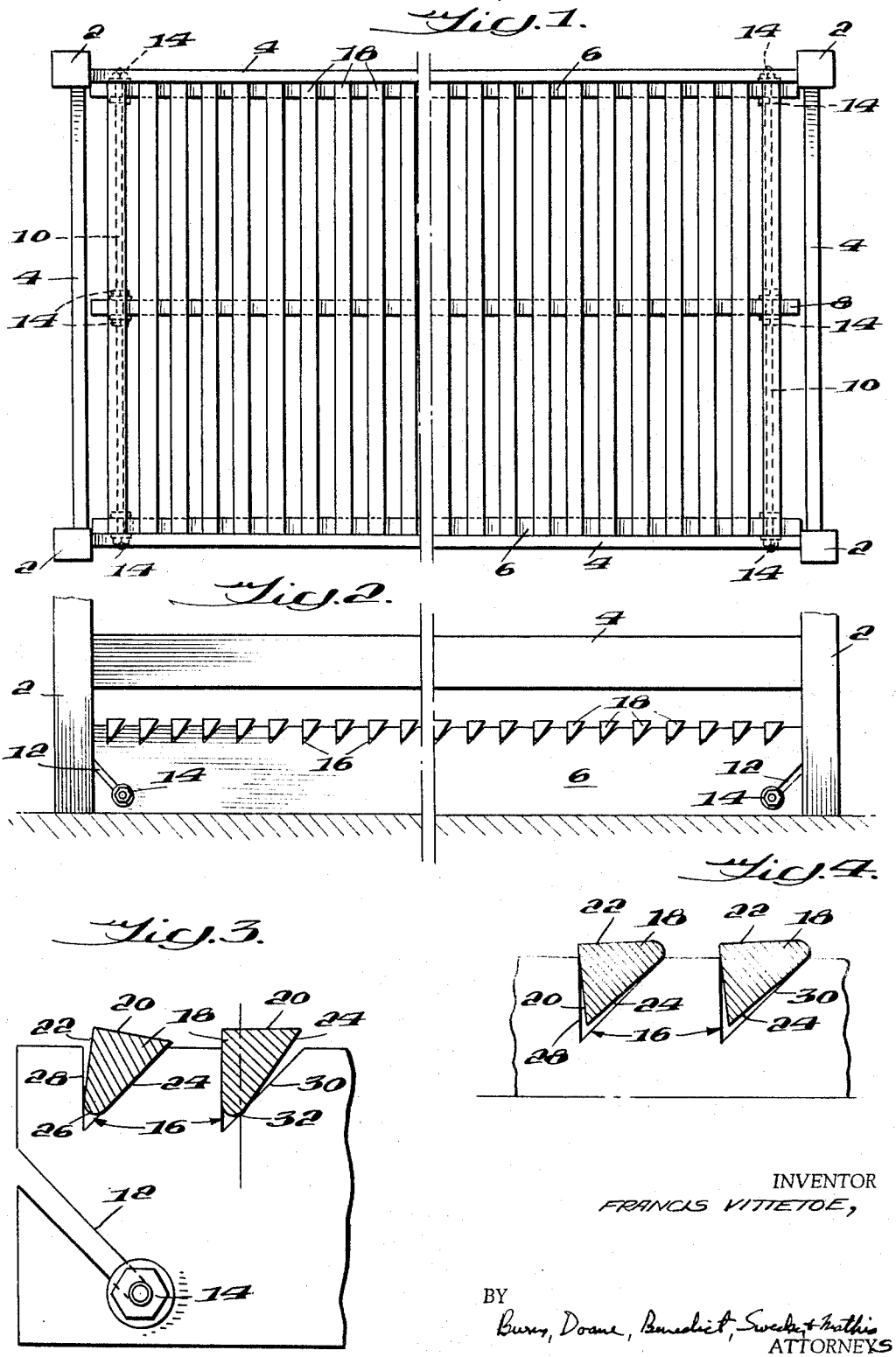

3,283,745
ROCKABLE SLAT LIVESTOCK FLOORING
Francis Vittetoe, Rte. 3, Keota, Iowa
Filed Jan. 8, 1965, Ser. No. 424,385
6 Claims. (Cl. 119—28)

This invention relates to flooring for livestock, and more particularly, to slatted livestock flooring.

Conventional slatted flooring for livestock has a plurality of parallel slats rigidly supported in a frame. The slats are spaced sufficiently close together that the feet of the animals which are standing on the flooring cannot enter the opening between the slats. Waste matter is trod upon by the animals and falls between the slats, and may be removed by a conveyor, lagoon system, or other means. The spacing between the slats must be sufficiently wide to permit the waste matter to pass between the slats, but if the spacing is too wide, there is the danger of injury to the animals. Because of the potential hazard to the animals, it is customary to provide close spacing between the slats, and this causes the opening between the slats to become clogged with waste matter and the flooring becomes ineffective for its intended purpose.

Accordingly, it is an object of this invention to provide an improved slatted flooring.

It is a further object of this invention to provide flooring having closely spaced slats, without impairing the disposal of waste matter between the slats.

It is a still further object of this invention to provide a slatted flooring which may be assembled and disassembled quickly and efficiently.

These objects are accomplished in accordance with the preferred embodiment of the invention by a pair of sills which are spaced apart and a plurality of slats extending between the sills. The slats are supported in notches in the sills, and the shape of the notches in cooperation with the shape of the sills provides limited rocking movement of the slats as the animals tread on the slats. Preferably, the slats are triangular in cross section and the notches are also triangular, but the included angle forming a notch is greater than the angle between two adjacent sides of a slat which fits into the notch. The slat is sufficiently thick to extend above the top of the notch to facilitate the rocking movement of the slat. As the slats rock back and forth in the notches, due to the movement of the animals on the flooring, the waste matter is partially compressed and worked through the openings between the slats. The angle between two other adjacent sides of a slat is preferably greater than the included angle of a notch, so that when the larger included angle of the slat is lodged in a notch, the slat does not rock relative to the notch.

This preferred embodiment of the invention is illustrated in the accompanying drawing in which:

FIG. 1 is a top plan view of the slatted flooring of this invention;

FIG. 2 is a side elevational view of the flooring;

FIG. 3 is an enlarged detail side elevational view, partly in section, of a sill and slats, with the slats in rocking position; and FIG. 4 is an enlarged side elevational view, partially in section, of a sill and slats with the slats in non-rocking position.

The flooring of this invention is illustrated as installed in a pen which, as shown in FIGS. 1 and 2, may be formed by posts 2 and rails 4. The flooring includes a pair of sills 6 which are spaced apart and a stringer 8 between the sills. Although only one stringer 8 is shown, additional stringers may be employed, depending upon the distance between the sills 6 and the rigidity required for the flooring. If the sills are placed sufficiently close together, the stringer 8 may be omitted.

The sills 6 and the stringer 8, if used, are secured together by tie rods 10. The sills have inclined slots 12 at each opposite end to receive the respective tie rods 10. Similar slots are provided in the stringer 8. The tie rods 10 are threaded for securing the sills and stringer together. Nuts 14 and washers on the tie rod 10 clamp the respective sills 6 and stringer 8 at the desired spacing. When the sills 6 and stringer 8 are secured together by the tie rods 10, they form a rigid frame.

The upper edge of each sill 6 and stringer 8 is provided with a plurality of notches 16 which are preferably uniformly spaced apart. The spacing between the notches 16 should be less than the length of the foot of an animal that will be standing on the flooring. The notches 16 are in substantial alignment and an elongated slat 18 rests in each of the notches 16 to form the supporting surface of the flooring.

As shown in FIG. 3, the slats 18 are preferably triangular in cross section, with the angle between two adjacent sides 20 and 22 being substantially a right angle. The included angle between the remaining side 24 and the side 20 is preferably greater than 45° and the included angle between the side 22 and the side 24 is less than 45°. Furthermore, the edge formed by the intersection of the sides 22 and 24, at the smaller included acute angle, is preferably rounded. The rounded edge 26 of each slat 18 forms a pivot for the slat in the notch 16.

Each notch preferably has an upright side 28 and a sloping side 30, and the acute angle at the intersection of the sides 28 and 30 is preferably greater than one of the acute angles of the slat 18, but less than the other acute angle of each slat. As shown diagrammatically in FIG. 3, the pivot point 32 for the slat 18 on the sloping side 30 of the notch is spaced from the upright side 28, so that the weight of an animal's foot acting to the left of the pivot point 32, as viewed in FIG. 3, causes the slat 18 to rock counterclockwise until the side 22 engages the upright side 28 of the notch. The slat will remain in that position until the animal steps on the slat at the right of the pivot point 32, thereby causing the slat to rock clockwise until the side 24 of the slat engages the sloping side 30 of the notch 16. Thus, as the animal walks across the flooring on the slats 18, the slats rock back and forth depending upon the position of the animal's foot relative to the pivot point 32 for each slat 18.

The acute angle between the sides 22 and 24 should not be so small that the slat rocks in a relatively large arc, since excessive movement may frighten the animals. The rocking movement of the slats 18 causes the waste matter to be compressed between adjacent slats. The pointed edge of the left hand slat in FIG. 3 moves downwardly as it rocks from the upright side 28 of the notch 16 to the sloping side 30. This movement not only compresses the waste matter between the slats, but also urges it to pass through the space between the slats. A conventional conveyor system or lagoon may be positioned under the slats 18 and between the sills 6 for removing the waste matter in a conventional manner.

It is necessary sometimes for the flooring to be rigid, for example, when sows are having pigs, and the rocking slats of this invention may be converted to a more rigid flooring by removing the slats 18 from the notches 16 and turning them end for end. The slats 18 are then positioned in the notches with the shorter side 20 facing the upright side 28 of the notch 16. Since the angle between the sides 20 and 24 is greater than the included angle between the sides 28 and 30 of the notch 16, the slats 18 are lodged rigidly in the notches, as shown in FIG. 4, and do not rock. The shape of the slats in combination with the notches 16 provide an arrangement for readily converting from a rocking type of slat flooring to a rigid flooring.

The slats of this invention may be formed by sawing conventional sizes of lumber longitudinally. A standard 2 x 4 board may be severed along a line intersecting the opposite corners to make two slats. Generally, slats made from 2 x 4 boards may be used for swine, 1 x 2 boards for poultry, and 2 x 6 boards for cattle. The stringer 8 may be placed where desired, but it is preferred that there by a separation of about two feet between the stringer 8 and an adjacent sill or stringer.

Although the use of wood for the slats 18 is preferred, they may be formed out of plastic, metal, reinforced concrete, or other materials. Similarly, the sills 6 and stringers 8 may be formed out of wood, plastic, metal, concrete or other materials.

The flooring of this invention may be disassembled rapidly, moved to a new location, and than reassembled. The flooring is disassembled by removing the slats 18 and unscrewing the nuts 14 sufficiently to allow the tie rods 10 to be displaced out of the slots 12. The individual slats 18, the sills 4 and the stringer 8 then may be transported to a new site. The flooring is reassembled by inserting the tie rods 10 into the slots 12 and tightening the respective nuts 14. The slats 18 are then positioned in the notches 16 to provide a rocking movement, or a rigid flooring, as desired. All parts of the flooring are portable and any size flooring may be assembled using the same tie rods 10, and without nailing.

While this invention has been illustrated and described in one embodiment, it is recognized that variations and changes may be made therein without departing from the invention as set forth in the claims.

I claim:
1. Livestock flooring comprising a pair of sills spaced apart, a plurality of slats extending between said sills, said slats each having a substantially flat side and forming a discontinuous horizontal supporting surface, and means for supporting said slats for rocking movement on said sills, said means including V-shaped openings in the sills with upwardly extending flaring sides and said slats each having triangularly shaped end portions including a bottom angle of a degree different from the angle of the V-shaped openings whereby the openings support the slats in a restrained rocking relationship.

2. Livestock flooring comprising a pair of sills spaced apart, said sills having a plurality of notches therein, and a plurality of slats extending between said sills and being lodged in said notches, said slats having a greater thickness than the depth of said notches and having substantially less width than said notches, whereby the slats rock in their respective notches.

3. Livestock flooring comprising a pair of sills spaced apart, said sills having a plurality of notches therein, and a plurality of slats extending between said sills and being lodged in said notches, said slats having three sides and being substantially triangular, said notches being substantially triangular, the angle between two adjacent sides of the slat being less than the included angle at the bottom of the notches, whereby when the slats are assembled in their respective notches with said slat angle adjacent the bottom of the notch, the slats rock in the notches.

4. Livestock flooring comprising a pair of sills spaced apart, said sills having a plurality of notches therein, and a plurality of slats extending between said sills and being lodged in said notches, said slats having three sides and being substantially triangular, said notches being substantially triangular, said triangular slats having a right angle between two adjacent sides and one of the acute angles being greater than 45° and the other acute angle being less than 45°, said notch being formed by a substantially upright side and a sloping side intersecting said upright side at an acute angle, whereby the slats rock in their respective notches.

5. Livestock flooring comprising a pair of sills spaced apart, said sills having a plurality of notches therein, and a plurality of slats extending between said sills and being lodged in said notches, said slats having three sides and being substantially triangular, said notches being substantially triangular, said triangular slats having a right angle between the adjacent sides and one of the acute angles being greater than 45° and the other acute angle being less than 45°, said notch being formed by a substantially upright side and a sloping side intersecting said upright side at an acute angle, said notch acute angle being greater than one of said slat acute angles, whereby the slats rock in their respective notches.

6. Livestock flooring comprising a pair of sills spaced apart, said sills having slats in their opposite ends, tie rods extending between said sills, said tie rods extending through said slats, means on the tie rods for securing the sills thereto, said sills having a plurality of notches therein, and a plurality of slats extending between said sills and being lodged in said notches, said slats having a greater thickness than the depth of said notches and having substantially less width than said notches, whereby the slats rock in their respective notches.

References Cited by the Examiner

UNITED STATES PATENTS

| | | | |
|---|---|---|---|
| 502,004 | 7/1893 | Logan | 119—28 |
| 854,083 | 5/1907 | Ellis et al. | 256—15 |
| 1,704,085 | 3/1929 | Holmgreen et al. | 256—15 |
| 2,744,728 | 5/1956 | Melchert et al. | 256—14 |
| 2,938,711 | 5/1960 | Luff | 256—17 |
| 3,137,270 | 6/1964 | Rigterink et al. | 119—28 |

FOREIGN PATENTS 549,202  11/1957  Canada.

ALDRICH F. MEDBERY, *Acting Primary Examiner.*